July 28, 1936.   D. W. SHERMAN   2,048,953
FRONT WHEEL UNIT FOR AUTOMOBILES
Original Filed Jan. 6, 1934   2 Sheets-Sheet 1
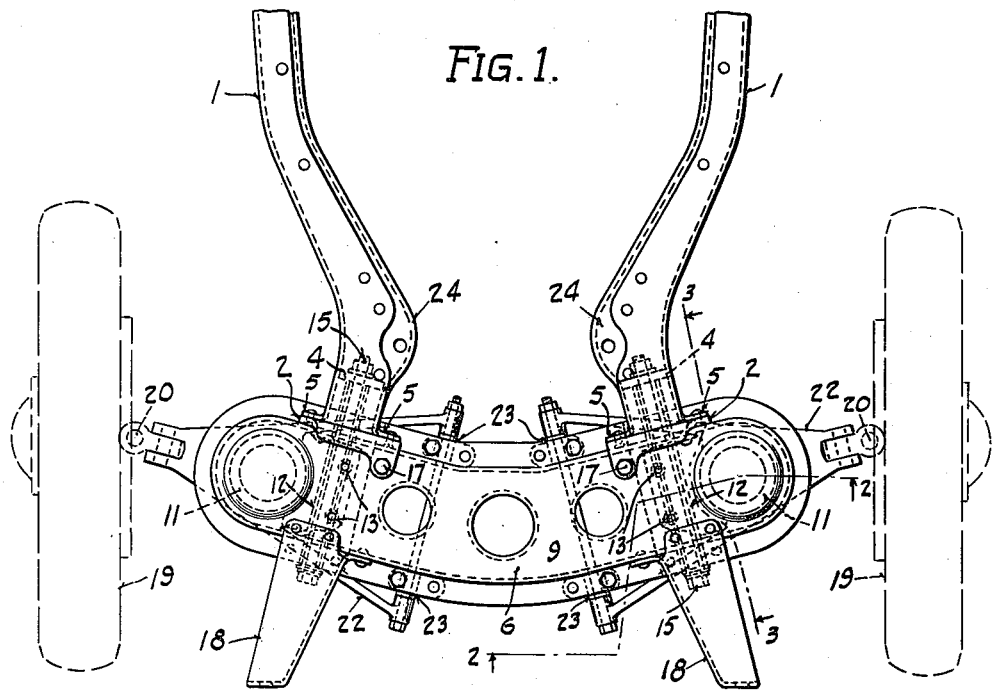
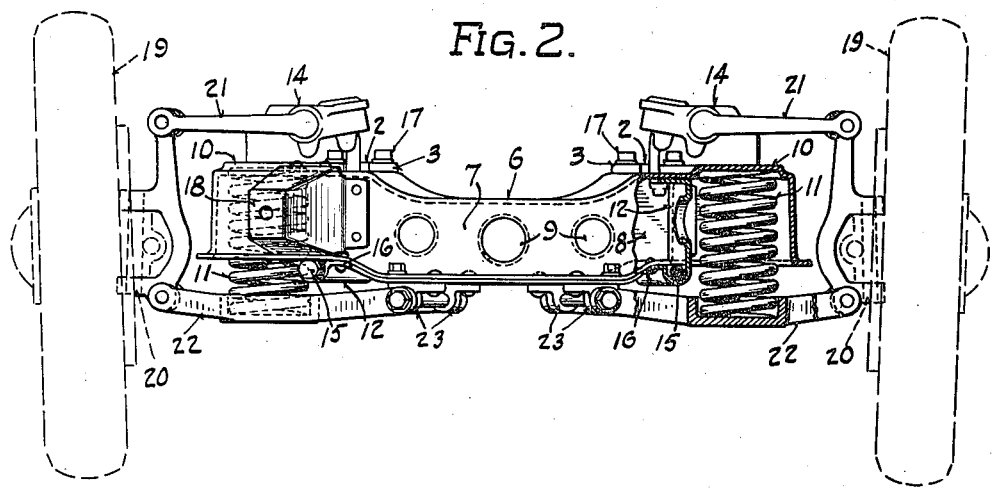
INVENTOR.
Donald W. Sherman
BY
ATTORNEY.

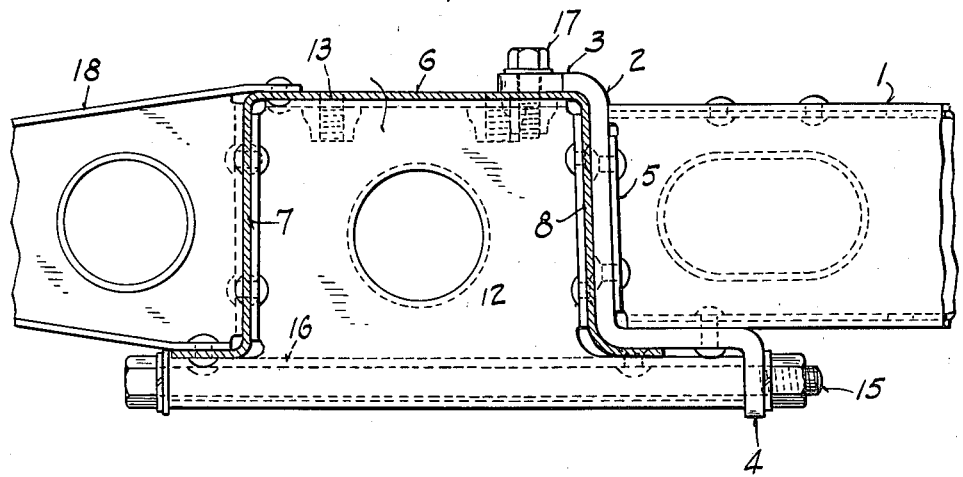
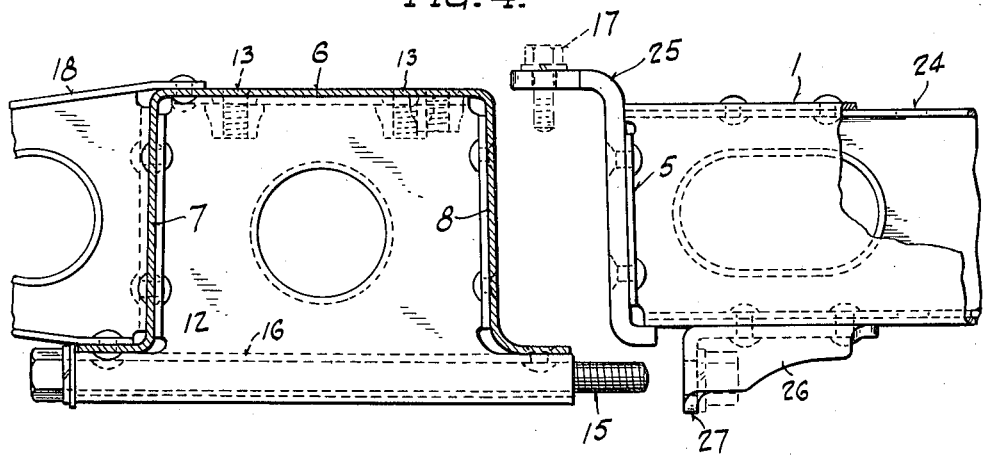
INVENTOR.
Donald W. Sherman
BY
ATTORNEY.

Patented July 28, 1936

2,048,953

UNITED STATES PATENT OFFICE 2,048,953

FRONT WHEEL UNIT FOR AUTOMOBILES

Donald W. Sherman, Shorewood, Wis., assignor to A. O. Smith Corporation, Milwaukee, Wis., a corporation of New York Application January 6, 1934, Serial No. 705,572
Renewed January 20, 1936

14 Claims. (Cl. 280—106.5)

This invention relates to a front wheel unit for automobiles and more particularly to a unit employing the independent front wheel mounting recently exploited commercially in automobile construction.

The object of the invention is to provide a light weight unit consisting of the front wheels and their independent mountings and which may be readily attached to the forward end of the automobile frame.

Another object is to provide a less expensive construction for the frame and front wheel mounting and one which simplifies assembly of the car.

Another object is to provide such a unit which may be readily detached from the car and removed for repair and inspection.

Other objects will appear hereinafter.

The preferred embodiment of the invention is illustrated in the accompanying drawings in which:

Figure 1 is a top plan view showing the unit attached to the forward end of the automobile frame;

Fig. 2 is a front elevation partially in section on line 2—2 of Fig. 1;

Fig. 3 is a section on line 3—3 of Fig. 1 without the wheels and spring mounting; and Fig. 4 is a section similar to Fig. 3 showing a modified form of bracket and with the parts separated ready for assembly.

The automobile frame proper has two side bars 1, preferably box shaped and connected rearwardly of the engine by suitable cross bars, not shown. The side bars are preferably constructed of two channel members facing each other and having their flanges engaging each other and riveted or otherwise secured together. The forward end of each side bar 1 has a bracket 2 riveted or otherwise attached thereto. As illustrated, each bracket may be formed of a metal plate extending vertically over the end of the side bar and rearwardly beneath the same, and has a forwardly extending flange 3 at its top edge and a downwardly extending flange 4 at its rear end. The bracket 2 is riveted directly to the under side of the side bar and to vertically extending side flanges 5 at the end of the side bar.

Attached to the brackets 2 is a sheet metal cross bar 6 of inverted channel shape and having lower side flanges 7 and 8 for strengthening the same. The bar 6 is suitably lightened in weight by means of openings 9 therein, and is of greater length than the width of the forward end of the frame and cupped to provide circular seats 10 for coil springs 11 at the ends of the bar and outside the point of attachment of the side bars 1.

A stiffening sheet metal brace 12 extends across the channel at the inner side of each seat 10 and has flanges riveted to the sides of the bar 6. The upper edge of the brace 12 is flanged to strengthen the top of the bar 6 and suitable openings 13 are provided therethrough for attachment of the shock absorbers 14. The lower edge of the brace 12 is curved to partially encircle a long bolt 15 which is adapted to secure the bar 6 to the bracket flange 4, and provides a flange 16 which is riveted to the forward flange 7 of the bar 6.

The bar 6 is attached to the flanges 3 of the brackets 2 by means of bolts 17 extending through the top of the bar.

Suitable bumper brackets 18 are riveted to the forward side of the bar 6.

The wheels 19 are mounted independently upon vertical king pins 20 for turning. The top of each king pin is held by the pivoted shock absorber arms 21 while the bottom of each king pin is secured by converging wishbone arms 22 pivoted to bearings 23 attached beneath the center of the bar 6. The coil springs 11 are mounted on the arms 22 to constitute the spring mounting for the car, there being very little unsprung weight at the forward end of the auto and each forward wheel being sprung entirely independent from the other.

The side bars 1 are preferably curved inwardly near the forward end to provide supports 24 for the engine independently of the cross bar 6. The automobile radiator may be supported on the bar 6 and may constitute a part of the removable unit, thereby facilitating repair of the engine which is mounted on the frame. By locating the bumper brackets 18, as shown, any shock applied to the bumper will not injure the unit, but will be transmitted directly through the braces 12 to the frame members 1. Furthermore, the braces 12 act as extensions of the side bars 1 to carry the beam loads and prevent distortion of the cross bar 6.

Fig. 4 illustrates a different type of bracket at the forward end of the side bar 1, the bracket being formed of two separate parts, the upper part 25 being similar to the upper part of bracket 2 while the lower part 26 is formed of a casting or forging and has a forward abutment 27 for receiving the bolt 15.

The type of wheel mounting illustrated requires very accurate construction of the bar 6 and its various attachments and, where, as heretofore, the cross bar has been constructed as a permanent part of the automobile frame, it has been found to be expensive to make the same accurate within the desired tolerances. The present invention entirely overcomes this difficulty by providing a bar 6 which may be drilled and have its attachments assembled thereto, and be trued independently of the frame. It may be readily attached to the forward end of the frame without affecting the accuracy of its construction, and a wheel mounting is thereby obtained which is more certain of being accurate and within commercial tolerances.

In assembling the automobile, the bar 6 may have the wheels and springs mounted thereon as a sub-assembly operation, and the entire unit may then be readily attached by the bolts 16 and 17 to the brackets 2 at the forward end of the auto frame. In case of needed repair, the entire unit may be readily removed from the car.

Various modifications of the embodiment may be employed within the scope of the accompanying claims.

The invention is claimed as follows:

1. In combination in an automobile, a frame having forwardly extending side bars and a supporting unit removably attached to the forward ends of said side bars, comprising a sheet metal cross member having a seat at each end for a coil spring, a road wheel at each end of said cross member and mounted on a vertical king pin for steering movement, shock absorbers mounted on said cross member and having pivoted arms secured to the upper ends of said king pins, pivoted arms securing the lower ends of the king pins to the central portion of said cross member, and coil springs mounted in said seats beneath said cross member for supporting the same upon said last named arms.

2. In combination in an automobile, a frame having forwardly extending side bars, a channel shaped cross member attached to the forward ends of said side bars, a pair of bumper brackets attached to the forward side of said cross member and substantially in alignment with said side bars, and braces extending across the channel of said cross member and adapted to transmit shocks from said bumper brackets to said frame side bars.

3. In combination in an automobile, a frame having forwardly extending side bars, a channel shaped cross member attached to the forward ends of said side bars, a pair of bumper brackets attached to the forward side of said cross member and substantially in alignment with said side bars, and braces extending across the channel of said cross member and adapted to transmit shocks from said bumper brackets to said frame side bars, said side bars being curved inwardly rearwardly of said cross member to provide means for supporting the forward end of the engine.

4. In combination in an automobile, a frame having forwardly extending side bars, a horizontal sheet metal cross member attached to the forward end of said side bars and extending forwardly therefrom, a road wheel at each end of said cross member and independently sprung thereto, and a brace in substantial alignment with said side bars for preventing distortion of said cross member and transmitting beam loads in cooperation with said side bars.

5. In combination in an automobile, a frame having forwardly extending side bars, a downwardly facing channel shaped cross member disposed at the forward ends of the side bars and attached thereto, a bracket beneath each side bar at its forward end, a bolt passing across the open bottom of said channel cross member from the forward side of the member to bolt the same to each of said brackets, braces extending across said channel member parallel with said bolts and substantially in alignment with said side bars, and means integral with said brace and forming a compression member for said bolt.

6. In combination in an automobile, a frame having forwardly extending side bars, a downwardly facing channel shaped cross member disposed at the forward ends of the side bars and attached thereto, a bracket beneath each side bar at its forward end, a bolt passing across the open bottom of said channel cross member from the forward side of the member to bolt the same to each of said brackets, and braces extending across said channel member parallel with said bolts and substantially in alignment with said side bars, said brace being curved at its lower edge to encircle said bolt for substantially the entire distance between the forward side of said channel member and said bracket to constitute a compression member for said bolt.

7. In combination in an automobile, a frame having two forwardly extending side rails, a forward cross bar joining said side rails and extending beyond the same at either side of the frame to provide seats for coil springs for independently mounting forward wheels, said cross bar being of sheet metal channel section having downwardly directed flanges along its sides and around its ends to strengthen the spring seats thereof, and means effecting an extension of said side rails forwardly to provide bumper brackets on the forward side of said cross bar and in alignment with said side rails.

8. In combination in an automobile, a frame having two forwardly extending side rails, a forward cross bar joining said side rails and extending beyond the same at either side of the frame to provide seats for coil springs for independently mounting forward wheels, said cross bar being of sheet metal channel section having downwardly directed flanges along its sides and around its ends to strengthen the spring seats thereof, and means effecting an extension of said side rails forwardly across the channel of said cross bar to prevent distortion of the cross bar and transmit beam loads.

9. In combination in an automobile, a frame having forwardly extending longitudinal bars, a horizontal sheet metal transverse bar attached to the forward ends of said longitudinal bars and extending forwardly therebeyond, a seat for a coil spring at each end of said transverse bar, and a road wheel independently mounted at each end of the transverse bar by means of a coil spring engaging each of said seats, said transverse bar, wheels and springs constituting a sub-assembly unit.

10. In combination in an automobile, a frame having forwardly extending longitudinal bars, a horizontal sheet metal transverse bar attached to the forward ends of said longitudinal bars and extending forwardly therefrom, a road wheel at each end of said transverse bar and independently sprung thereto, and a brace in substantial alignment with each longitudinal bar for preventing distortion of said transverse bar and transmitting beam loads in cooperation with said longitudinal bars, said transverse bar, wheels and brace constituting a sub-assembly unit.

11. In combination in an automobile, a frame having forwardly extending side bars, a bracket on the forward end of each side bar, a horizontal sheet metal cross member attached to said brackets and extending forwardly beyond the ends of said side bars, and a road wheel at each end of said cross member and independently sprung thereto, said cross member and road wheels constituting an independent detachable sub-assembly unit for attachment to said brackets.

12. In combination in an automobile, a frame having forwardly extending side bars, a horizontal sheet metal cross member attached to the forward end of said side bars and extending forwardly therefrom for supporting the automobile on the forward wheels, and means in substantial alignment with said side bars for preventing distortion of said cross member and transmitting beam loads in cooperation with said side bars.

13. In combination in an automobile, a frame having two side rails with their forward end portions brought inwardly, a forward cross bar joining said side rails at said forward end portions and extending beyond the same at either side of the frame, a seat for a spring mounting at each end of said cross bar and in substantial alignment with the main portion of the respective side rails, and parts forming extensions of said side rails forwardly to provide bumper brackets.

14. In combination in an automobile, a frame having two longitudinal side rails, a forward cross bar joining said side rails at the forward ends thereof and extending beyond the same at either side of the frame, a seat for a spring mounting at each end of said cross bar and on the outside of said respective side rails, and members forming extensions of said side rails between said spring seats and extending forwardly to provide bumper brackets.

DONALD W. SHERMAN.